(12) United States Patent
Yoon et al.

(10) Patent No.: US 7,349,057 B2
(45) Date of Patent: Mar. 25, 2008

(54) LIQUID CRYSTAL DISPLAY PANEL AND METHOD OF FABRICATING THE SAME

(75) Inventors: Ji Su Yoon, Seoul (KR); Ho Young Jeong, Seoul (KR)

(73) Assignee: LG. Philips LCD Co., Ltd, Seoul (KR)

( * ) Notice: Subject to any disclaimer, the term of this patent is extended or adjusted under 35 U.S.C. 154(b) by 281 days.

(21) Appl. No.: 10/973,168

(22) Filed: Oct. 26, 2004

(65) Prior Publication Data

US 2005/0110937 A1    May 26, 2005

(30) Foreign Application Priority Data

Nov. 22, 2003 (KR) .......................10-2003-0083351

(51) Int. Cl.
*G02F 1/1339* (2006.01)

(52) U.S. Cl. ....................................... 349/153; 349/190

(58) Field of Classification Search ........ 349/153–154, 349/189–190
See application file for complete search history.

(56) References Cited

U.S. PATENT DOCUMENTS 6,124,917 A * 9/2000 Fujioka et al. ............... 349/153
6,463,977 B1 * 10/2002 Youn .......................... 349/154

* cited by examiner

*Primary Examiner*—Dung T. Nguyen
(74) *Attorney, Agent, or Firm*—Brinks Hofer Gilson & Lione

(57) ABSTRACT

A liquid crystal display panel and a method of fabricating the same capable of preventing a gravity defect of the liquid crystal display panel to improve the picture quality are disclosed. A liquid crystal display panel includes a sealant for combining a first substrate and a second substrate. One side of the sealant is located in a direction opposite to a gravity direction and has a concavo-convex shape.

23 Claims, 8 Drawing Sheets

65

LIQUID CRYSTAL DISPLAY PANEL AND METHOD OF FABRICATING THE SAME

This application claims the benefit of Korean Patent Application No. P2003-83351 filed in Korea on Nov. 22, 2003, which is hereby incorporated by reference.

BACKGROUND

1. Technical Field

The present invention relates to a liquid crystal display panel and more particularly, to a liquid crystal display panel and a method of fabricating the same capable of preventing a gravity defect of the liquid crystal display panel to improve a picture quality.

2. Description of the Related Art

In general, a liquid crystal display (LCD) device controls the light transmittance of liquid crystal cells using electric field to thereby display a picture.

To this end, the LCD device includes a liquid crystal display panel having liquid crystal cells arranged in an active matrix, and driving circuits for driving the liquid crystal panel.

The liquid crystal display panel is provided with pixel electrodes and a reference electrode, i.e., a common electrode, to supply the electric field to each of the liquid crystal cells.

Usually, each of the pixel electrodes is formed for each liquid crystal cell on a lower glass, while the common electrode is formed as an integrated whole on the entire surface of an upper glass. Each pixel electrode is connected to a thin film transistor (TFT) that is used as a switching element.

The pixel electrode together with the common electrode drives the liquid crystal cell in response to data signals supplied via the TFT.

FIG. 1 is a perspective view illustrating a related art liquid crystal display panel.

Referring to FIG. 1, there is shown a liquid crystal display panel in accordance with the related art, which includes upper and lower array substrates 10 and 20 combined together, and a liquid crystal material 8 between the upper and the lower array substrates 10 and 20.

The liquid crystal material 8 rotates, in response to an electric field supplied thereto, to thereby adjust the transmittance of incident light via the lower array substrate 20.

The upper array substrate 10 includes a color filter 4, a common electrode 6 and an upper alignment film (not shown), formed on a rear surface of the upper glass 1.

The color filter 4 includes color filters of red (R), green (G), and blue (B) and makes it possible to display colors by passing light having a specific wavelength band. A black matrix 2 is placed between the color filters 4 adjacent each other and prevents the degradation of the contrast ratio by absorbing the light incident from the adjacent cells.

The lower array substrate 20 includes: a data line 18 and a gate line 12, which cross each other and are insulated each other by a gate insulating layer located therebetween, formed on the entire surface of the lower glass 21; and further a TFT 16 at the crossing of the data line 18 and the gate line 12.

The TFT 16 includes: a gate electrode connected to the gate line 12; a source electrode connected to the data line 18; and a drain electrode facing the source electrode with a channel portion including an active layer and an ohmic contact layer therebetween. The TFT 16 is connected to the pixel electrode 14 via a contact hole passing through a passivation film.

In response to gate signals from the gate line 12, the TFT 16 selectively supplies data signals from the data line 18 to the pixel electrode 14.

The pixel electrode 14 is made from a transparent conductive material having a high light transmittance and is in a cell region formed by the data line 18 and gate line 12.

The pixel electrode 14 generates a potential difference along with a common electrode 6 by data signals supplied via the drain electrode. Under the influence of the potential difference, the liquid crystal material 8 between the upper and lower substrates 1 and 21 rotates due to the dielectric anisotropy thereof. Hence, the light supplied via the pixel electrode 14 from the light source passes toward the upper substrate 1.

Spacers maintain the cell gap between the upper and the lower array substrates 10 and 20. A sealant 55 is applied in a rectangular form as shown in FIG. 2 to the upper array substrate 10 or the lower array substrate 20. Thereafter, the upper array substrate 10 is combined with the lower array substrate 20. And then, the liquid crystal material 8 is injected through a liquid crystal injection hole 55a in an inner space provided by the spacer 22.

According to the related art liquid crystal display panel formed by above-mentioned method, if the liquid crystal material 8 injected between the upper array substrate 10 and the lower array substrate 20 is exposed to a high temperature, a defect due to gravity (hereinafter, referred to as a gravity defect) occurs. The gravity defect occurs because the liquid crystal material flows in the direction of gravity to thereby deteriorate the picture quality.

More specifically, after the liquid crystal material 8 is injected into the inner space provided by the spacer 22, a voltage is supplied to the common electrode 6 formed on the upper glass 1 and to the pixel electrode 15 formed on the lower glass 21 in order to operate the liquid crystal display panel. The supplied voltage raises the temperature of the inner space provided by the spacer 22. As a result, a volume of the liquid crystal material 8 in the inner space expands. As shown in FIG. 3A, the cell gap thus becomes large due to the expanded liquid crystal material, so that the spacer 22 is separated from the upper glass 1 or the lower glass 21 and the expanded liquid crystal material 8 flows in the gravity direction, to thereby cause the gravity defect and distort at least one of the upper glass 1 and the lower glass 21. Accordingly, as shown in FIG. 3B, a stain 65 appears in a region where the liquid crystal material is over-filled, which results in deterioration of the picture quality.

SUMMARY

By way of introduction only, a liquid crystal display panel according to an embodiment of the present invention includes a first substrate, a second substrate opposing the first substrate, a sealant for combining the first and second substrates disposed on one of the first and second substrates, and liquid crystal material disposed between the first and second substrates. One side of the sealant has a concavo-convex shape.

In addition in different embodiments, a space bounded by the first and second substrates and the sealant includes a filled region that contains the liquid crystal material and a dummy region that is devoid of the liquid crystal material. The dummy region is disposed such that a portion of the liquid crystal material moves into the dummy region when the liquid crystal material is exposed to a high temperature. When the liquid crystal display panel is disposed such that gravity pulls the liquid crystal material downward, the concavo-convex side of the sealant is an upper side of the sealant. A spacer maintains a cell gap between the first and second substrates.

In another embodiment, the liquid crystal display panel includes a first substrate, a second substrate opposing the first substrate, a sealant disposed on one of the first and second substrates, and liquid crystal material contained within a cavity bounded by the first and second substrates and the sealant. The sealant forms a plurality of retaining portions having cavities that are not completely filled with the liquid crystal material when the liquid crystal display panel is quiescent but are sufficient to contain liquid crystal material that has expanded during operation of the liquid crystal display panel.

Similarly, various embodiments exist in which the retaining portions are free from the liquid crystal material when the quiescent liquid crystal display panel is vertically disposed. A remainder cavity of the quiescent liquid crystal display panel formed by a remaining portion of the sealant other than the retaining portions is completely filled with the liquid crystal material. The retaining portions are formed in an uppermost portion of the sealant when the liquid crystal display panel is vertically disposed. A spacer maintains a cell gap between the first and second substrates.

A method of fabricating a liquid crystal display panel in one embodiment includes: providing first and second substrates, forming a sealant on one of the first and second substrates, the sealant having a side with a plurality of curves, combining the first and second substrates, and introducing liquid crystal material into a cavity formed by the first and second substrates and the sealant such that the liquid crystal does not completely fill spaces formed by the curves.

In certain embodiments, no liquid crystal material is present in the spaces when the liquid crystal display panel is vertically disposed and quiescent. The liquid crystal material fills a remaining space other than the spaces formed by the curves when the liquid crystal display panel is vertically disposed and quiescent. The method includes operating the liquid crystal display panel such that the liquid crystal material expands. The spaces have enough volume to contain the expanded liquid crystal material. The method includes forming a spacer on the first or second substrate for maintaining a cell gap between the first and second substrates. The liquid crystal material is introduced into the cavity by injection through an injection port in the sealant. The method further comprises sealing the injection port.

BRIEF DESCRIPTION OF THE DRAWINGS

The following detailed description of the embodiments of the present invention reference the accompanying drawings, in which.

DETAILED DESCRIPTION OF THE EMBODIMENTS

Reference will now be made in detail to the embodiments of the present invention, examples of which are illustrated in the accompanying drawing.

Hereinafter, the preferred embodiments of the present invention will be described in detail with reference to FIGS. 4 to 7.

Figure 1:
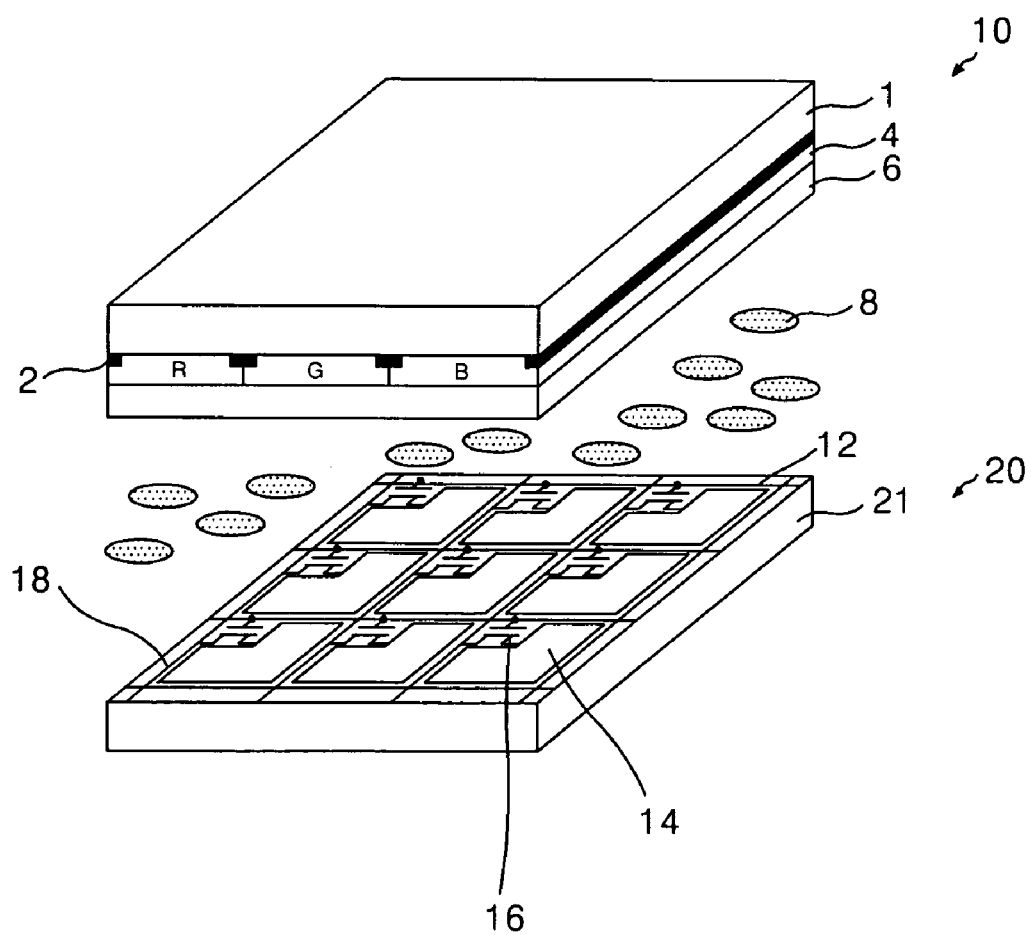
FIG. 1 is a perspective view illustrating a related art liquid crystal display panel.
Figure 2:
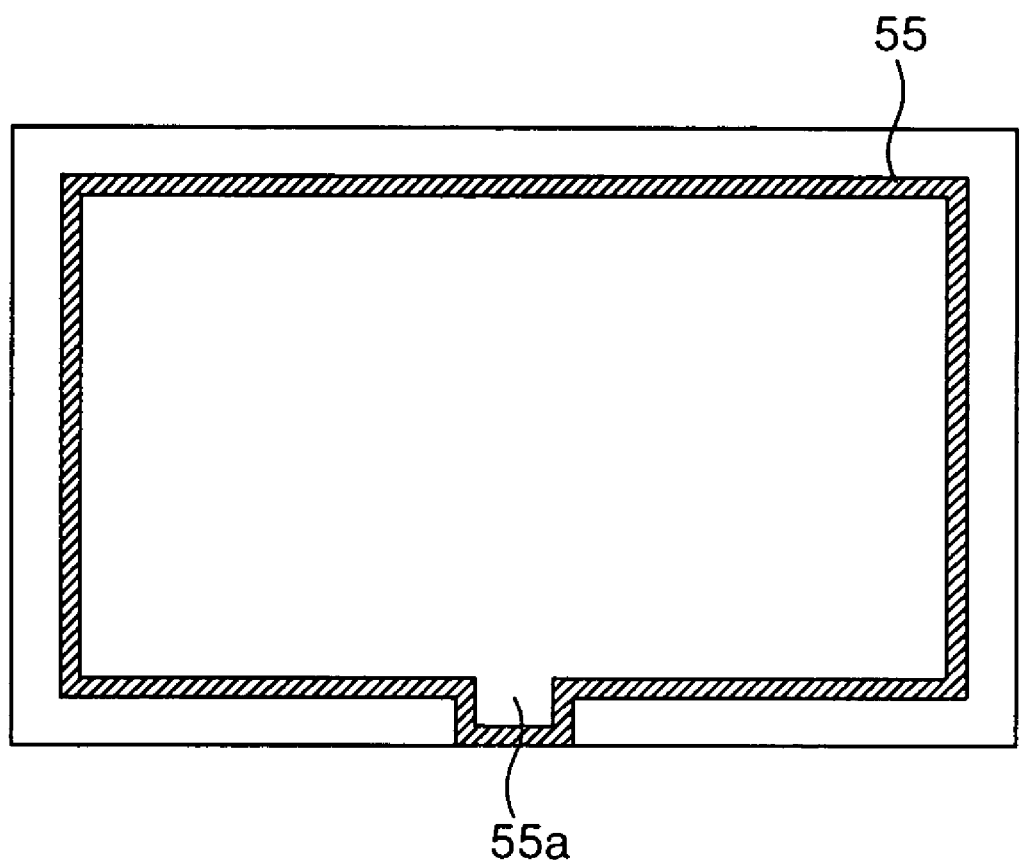
FIG. 2 is a configuration of a sealant formed on an upper array substrate or a lower array substrate of the liquid crystal display panel shown in FIG. 1.
Figure 3A:
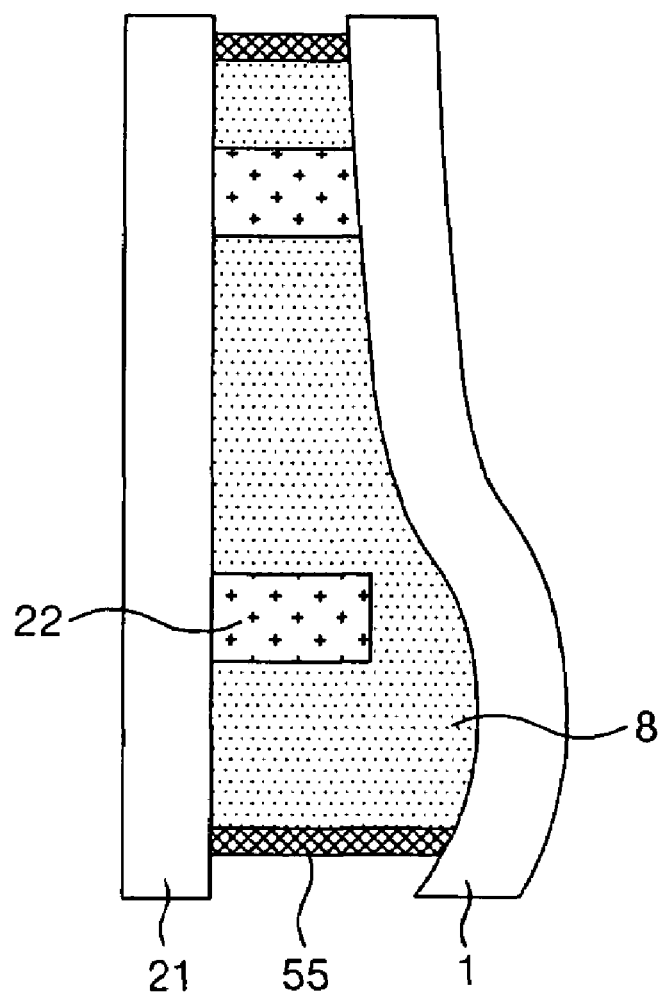
FIGS. 3A and 3B are configurations of a gravity defect of the liquid crystal display panel shown in FIG. 2.
Figure 3B:
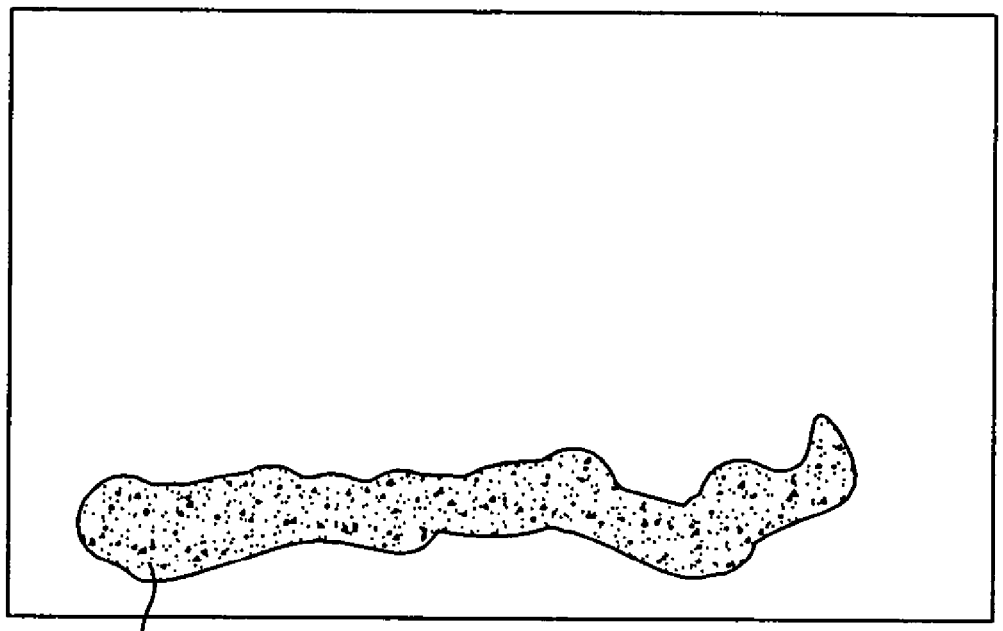
Figure 4:
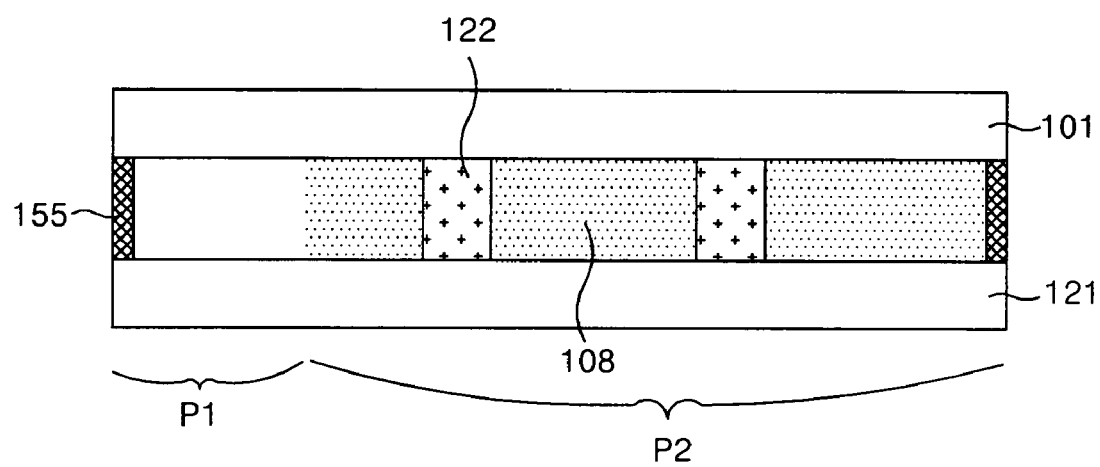
FIG. 4 is a sectional view briefly illustrating a liquid crystal display panel according to an embodiment of the present invention.
Figure 5:
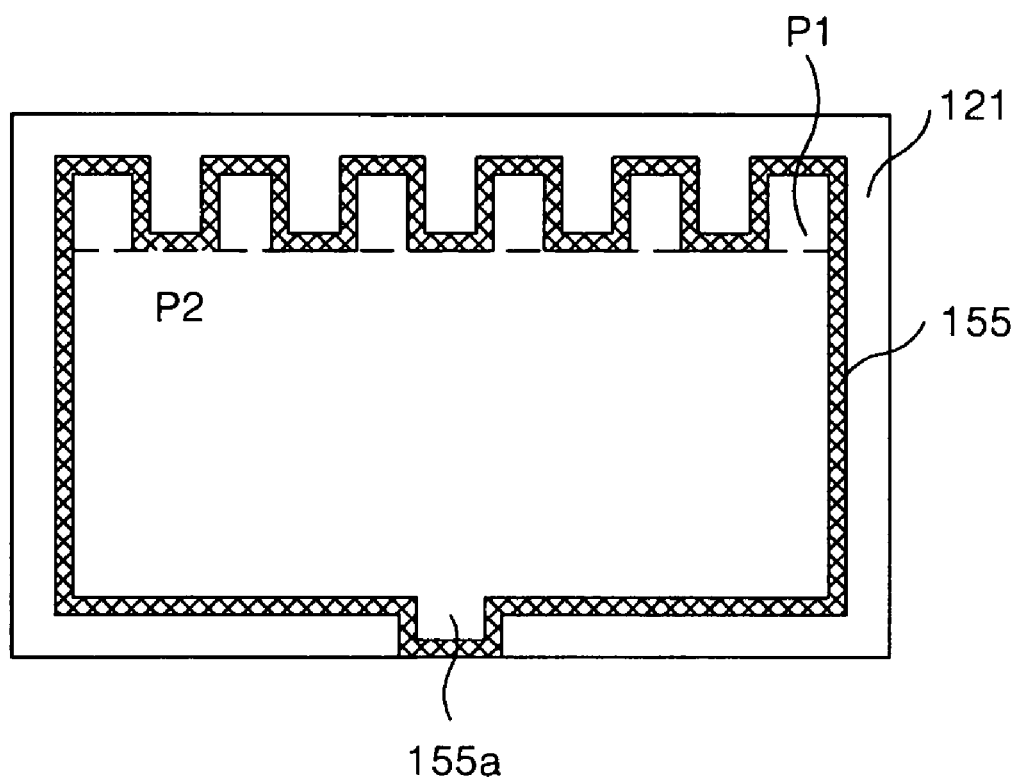
FIG. 5 is a configuration of a sealant formed on an upper array substrate or a lower array substrate of the liquid crystal display panel shown in FIG. 4.

FIG. 4 is a sectional view briefly illustrating a liquid crystal display panel according to an embodiment of the present invention.

Referring to FIG. 4, there is shown a liquid crystal display panel in accordance with the present invention, which includes upper and lower array substrates 101 and 121 combined together, and a liquid crystal material 108 filled between the upper and the lower array substrates 101 and 121.

The upper array substrate 101 includes a color filter, a common electrode and an upper alignment film (not shown), formed on a rear surface of an upper glass.

The color filter includes color filters of red (R), green (G), and blue (B) and makes it possible to display colors by passing light having a specific wavelength band through each color filter. A black matrix is placed between the color filters adjacent each other, and prevents the degradation of contrast by absorbing the light incident from the adjacent cells.

The lower array substrate 121 includes: a data line and a gate line, which cross each other and are insulated from each other by a gate insulating layer located therebetween, formed on an entire surface of a lower glass and further includes a TFT placed at the crossing of the data line and the gate line.

The TFT includes: a gate electrode connected to the gate line; a source electrode connected to the data line; and a drain electrode facing to the source electrode with a channel portion including an active layer and an ohmic contact layer therebetween.

The TFT is connected to the pixel electrode via a contact hole passing through a passivation film.

The pixel electrode generates a potential difference along with a common electrode by data signals supplied via the drain electrode. Under the influence of the potential difference, the liquid crystal material between the upper and lower substrates rotates due to the dielectric anisotropy thereof. Hence, the light supplied via the pixel electrode from the light source passes toward the upper glass.

The upper and the lower array substrates 101 and 121 have cell gaps maintained by spacers. The upper array substrate 101 is combined with the lower array substrate 121 by a sealant 155 whose upper portion has a concavo-convex shape. Accordingly, an inner space of the liquid crystal display panel has a filled region P2 where the liquid crystal material 108 is filled, and a dummy region P1 where the liquid crystal material 108 is not filled and which adjoins or extends from the filled region P2. The filled region P2 and the dummy region P1 are divided by the sealant whose upper portion has the concavo-convex shape.

After that, the liquid crystal material 108 is injected into the filled region P2 through a liquid crystal injection hole 155a.

If the liquid crystal display panel is exposed to a high temperature, the liquid crystal material 108 expands. The expanded liquid crystal material moves into the dummy region P1 of the liquid crystal display panel. Accordingly, it is possible to prevent a gravity defect from occurring.

Figure 6:
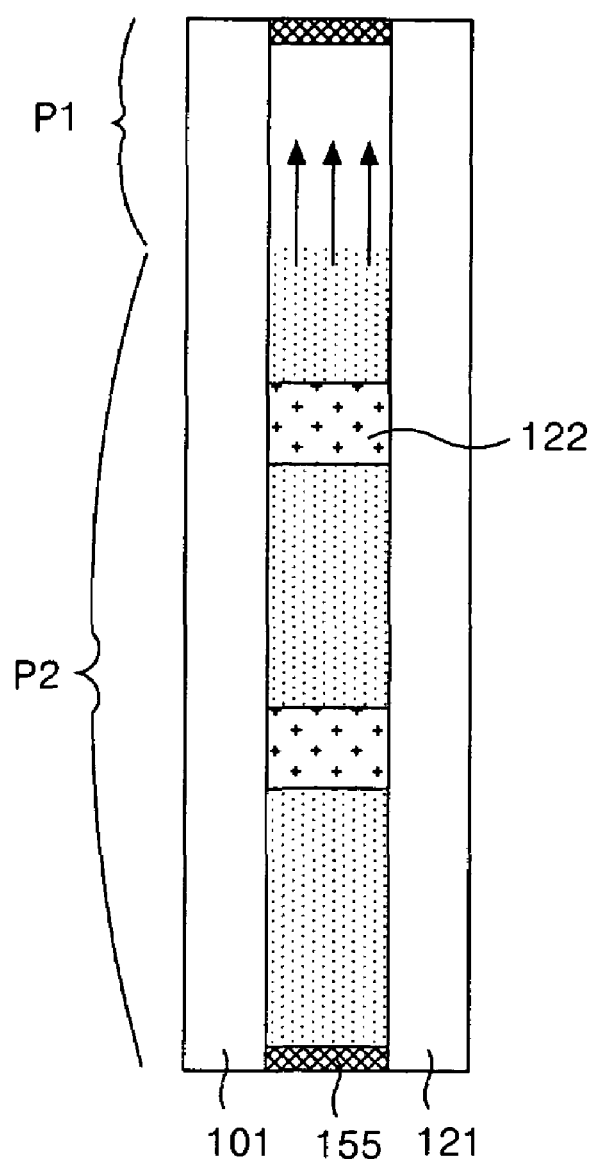
FIG. 6 is a configuration illustrating a liquid crystal material in a filled region of the liquid crystal display panel moving into a dummy region.

More specifically, after the liquid crystal material 108 is injected in the liquid crystal display panel, a voltage is supplied to the common electrode formed and to the pixel electrode in order to operate the liquid crystal display panel. The supplied voltage raises the temperature of the inner space provided by the spacer. As a result, a volume of the liquid crystal material 108 injected in the inner space expands. A portion of the expanded liquid crystal material 108 moves into the dummy region P1 formed on an upper portion of the liquid crystal display panel as shown in FIG. 6.

Herein, the force of gravity exerted on the liquid crystal material 108 toward a lower portion of the liquid crystal display panel and the surface tension of the liquid crystal material 108 in the dummy region P1 balance each other. Thus, the liquid crystal material 108 can be safely accommodated in the dummy region P1.

Accordingly, in comparison with the related art, it is possible to prevent a gravity defect causing the spacer 122 to be separated from the upper array substrate or the lower array substrate or causing warping of the substrate due to the expanded liquid crystal material, to thereby improve the picture quality.

Figure 7:
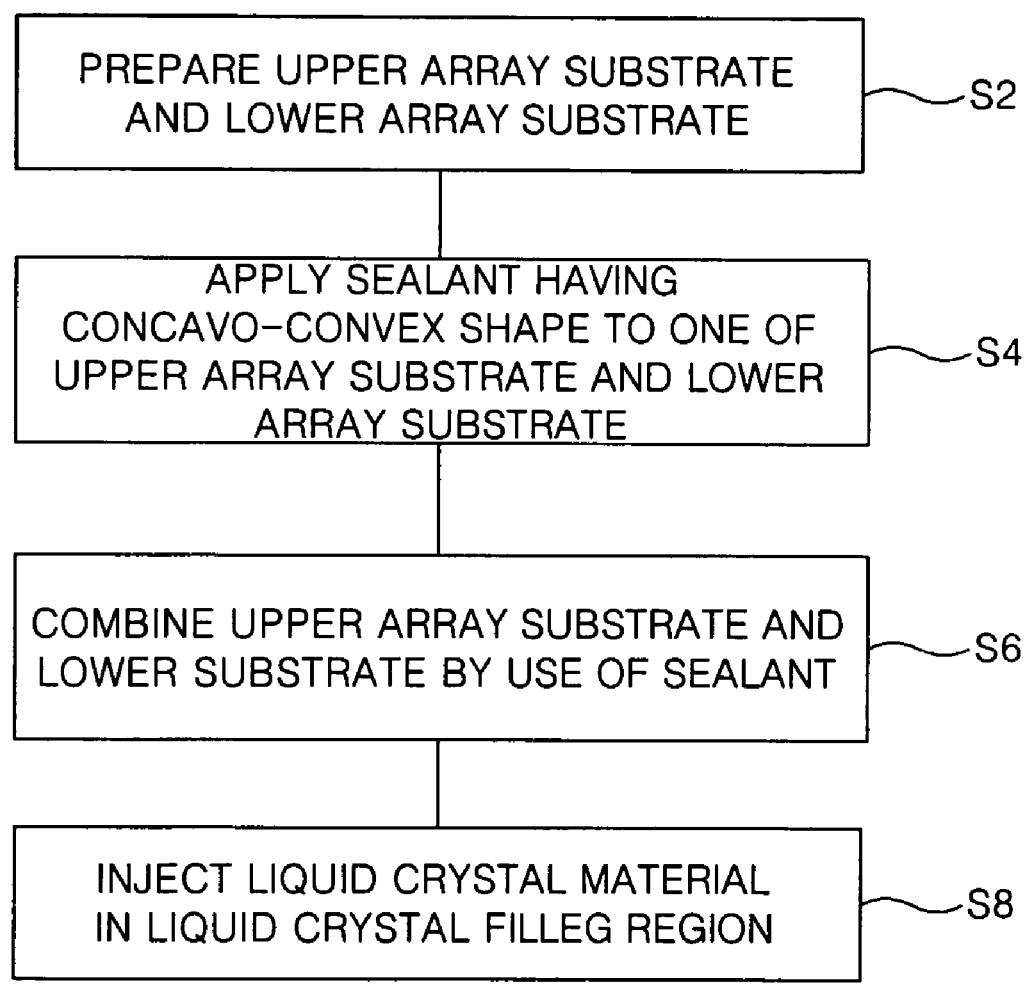
FIG. 7 is a flow chart describing a method of fabricating the liquid crystal display panel of FIG. 4.

Hereinafter, a method of fabricating the liquid crystal display panel according to an embodiment of the present invention will be described with reference to the flow chart shown in FIG. 7.

First of all, at step S2, an upper array substrate 101 having a color filter, a black matrix and the like formed on an upper glass and a lower array substrate 121 having a plurality of signal lines, a thin film transistor and pixel electrode formed on a lower glass are prepared.

The upper array substrate 101 includes the color filter, a common electrode and an upper alignment film formed on a rear surface of the upper glass. The lower array substrate 121 includes: a data line and a gate line, which cross each other and are insulated through a gate insulating layer located therebetween, formed on the entire surface of the lower glass, and a TFT at the crossing of the data line and the gate line. Herein, a spacer 122 for maintaining a cell gap is formed in the upper array substrate or the lower array substrate.

Thereafter, at step S4, a sealant 155 with a concavo-convex shape is applied to an upper side of the upper array substrate 101 or the lower array substrate 121. The upper side is opposite to the direction of gravity.

At step S6, the upper array substrate 101 and the lower array substrate 121 are combined by the concavo-convex shaped sealant 155.

Subsequently, at step S8, a liquid crystal material 108 is injected into a filled region P2 through a liquid crystal injection hole 155a.

According to the liquid crystal display panel and the method of fabricating the same described herein, the upper array substrate 101 is combined with the lower array substrate 121 by the sealant 155 whose upper portion has a concavo-convex shape. Accordingly, the inner space of the liquid crystal display panel includes a filled region P2 where the liquid crystal material 108 is filled, and a dummy region P1 where the liquid crystal material 108 is not filled.

Accordingly, when the liquid crystal display panel is exposed to a high temperature to expand the liquid crystal material 108, the expanded liquid crystal material 108 moves into the dummy region P1 of the liquid crystal display panel.

Hereby, a gravity defect causing the substrate to bend due to the expansion of the liquid crystal material as in the related art is prevented, to thereby improve a picture quality.

As described above, according to the liquid crystal display panel and the method of fabricating the same described herein, the upper array substrate and the lower array substrate are combined by a sealant whose upper portion has a concavo-convex shape. Accordingly, the inner space of the liquid crystal display panel includes a filled region where the liquid crystal material is filled, and a dummy region where the liquid crystal material is not filled. Accordingly, if the liquid crystal display panel is exposed to a high temperature, then the liquid crystal material expands and the expanded liquid crystal material moves into the dummy region of the liquid crystal display panel. As a result, the gravity defect is prevented. Thus, it is possible to improve a picture quality.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel comprising:
a first substrate;
a second substrate opposing the first substrate;
a sealant for combining the first and second substrates disposed on one of the first and second substrates; and
liquid crystal material disposed between the first and second substrates, wherein one side of the sealant has a concavo-convex shape, and the sealant contains a sealed injection hole formed in a side of the sealant opposing the concavo-convex side of the sealant.

2. The liquid crystal display panel according to claim 1, wherein a space bounded by the first and second substrates and the sealant includes a filled region that contains the liquid crystal material and a dummy region that is devoid of the liquid crystal material.

3. The liquid crystal display panel according to claim 2, wherein the dummy region extends from the filled region.

4. The liquid crystal display panel according to claim 2, wherein the dummy region is disposed such that a portion of the liquid crystal material moves into the dummy region when the liquid crystal material is exposed to a high temperature.

5. The liquid crystal display panel according to claim 2, wherein the dummy region is wholly contained within curves that form the concavo-convex side of the sealant.

6. The liquid crystal display panel according to claim 5, wherein the dummy region has a volume sufficient to contain liquid crystal material that has expanded during operation of the liquid crystal display panel.

7. The liquid crystal display panel according to claim 5, wherein the curves are regularly spaced along the concavo-convex side of the sealant.

8. The liquid crystal display panel according to claim 5, wherein a lowermost portion of the curves delineates a boundary between the filled and dummy regions.

9. The liquid crystal display panel according to claim 1, further comprising a spacer for maintaining a cell gap between the first and second substrates.

10. The liquid crystal display panel according to claim 9, wherein the spacer contacts the first and second substrates.

11. The liquid crystal display panel according to claim 1, wherein the liquid crystal display panel is disposed such that gravity pulls the liquid crystal material downward and the concavo-convex side of the sealant is an upper side of the sealant.

12. The liquid crystal display panel according to claim 1, wherein the entirety of the one side of the sealant has the concavo-convex shape.

13. A liquid crystal display panel comprising:
a first substrate;
a second substrate opposing the first substrate;
a sealant disposed on one of the first and second substrates; and
liquid crystal material contained within a cavity bounded by the first and second substrates and the sealant,
wherein the sealant forms a plurality of retaining portions having cavities that are not completely filled with the liquid crystal material when the liquid crystal display panel is quiescent but are sufficient to contain liquid crystal material that has expanded during operation of the liquid crystal display panel.

14. The liquid crystal display panel according to claim 13, wherein the retaining portions are free from the liquid crystal material when the quiescent liquid crystal display panel is vertically disposed.

15. The liquid crystal display panel according to claim 13, wherein a remainder cavity of the quiescent liquid crystal display panel formed by a remaining portion of the sealant other than the retaining portions is completely filled with the liquid crystal material.

16. The liquid crystal display panel according to claim 13, wherein the retaining portions are regularly spaced.

17. The liquid crystal display panel according to claim 13, wherein the retaining portions are formed in an uppermost portion of the sealant when the liquid crystal display panel is vertically disposed.

18. The liquid crystal display panel according to claim 13, further comprising a spacer for maintaining a cell gap between the first and second substrates.

19. The liquid crystal display panel according to claim 18, wherein the spacer contacts the first and second substrates.

20. The liquid crystal display panel according to claim 13, wherein the sealant contains a sealed injection hole opposing the retaining portions.

21. The liquid crystal display panel according to claim 13, wherein the retaining portions are formed along an entire side of the sealant.

22. The liquid crystal display panel according to claim 13, wherein the retaining portions are substantially rectangular.

23. A liquid crystal display panel comprising:
a first substrate;
a second substrate opposing the first substrate;
a sealant for combining the first and second substrates disposed on one of the first and second substrates; and
liquid crystal material disposed between the first and second substrates, wherein an entirety of one side of the sealant has a concavo-convex shape.

\* \* \* \* \*